(No Model.)

W. A. TALLEY.
COTTON CHOPPER AND SCRAPER.

No. 500,679. Patented July 4, 1893.

Witnesses
A. Ruppert,
H. A. Daniel,

Inventor
Wm. A. Talley
Per
Thomas P. Simpson
atty

UNITED STATES PATENT OFFICE.

WILLIAM ASA TALLEY, OF JESSIEVILLE, ASSIGNOR OF ONE-HALF TO JAMES S. FULTON, OF HOT SPRINGS, ARKANSAS.

COTTON CHOPPER AND SCRAPER.

SPECIFICATION forming part of Letters Patent No. 500,679, dated July 4, 1893.

Application filed August 6, 1891. Renewed May 3, 1893. Serial No. 472,909. (No model.)

*To all whom it may concern:*

Be it known that I, WILLIAM ASA TALLEY, a citizen of the United States, residing at Jessieville, in the county of Garland and State of Arkansas, have invented certain new and useful Improvements in Choppers and Scrapers; and I do hereby declare the following to be a full, clear, and exact description of the invention, such as will enable others skilled in the art to which it appertains to make and use the same.

The special object of the invention is to make a machine by which a row of cotton plants may be scraped and chopped or thinned at one operation.

Figure 1:
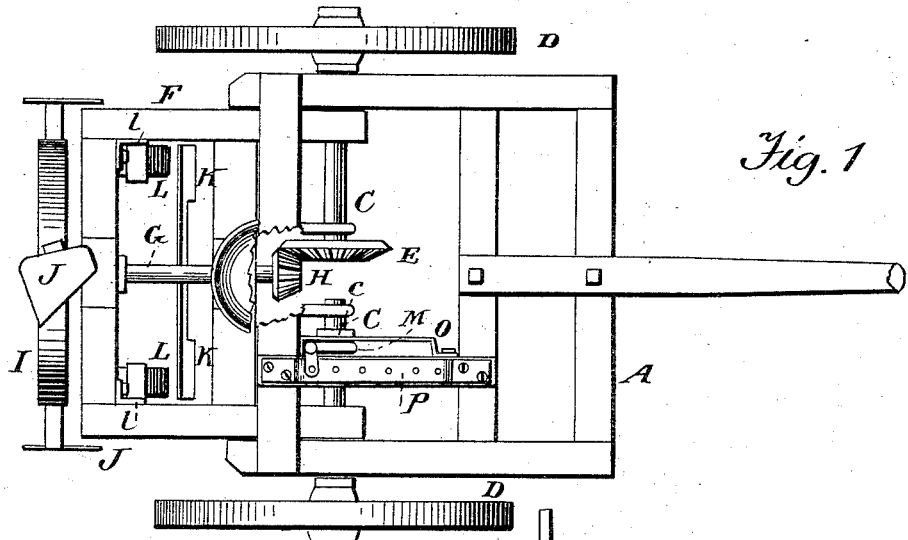
Figure 2:
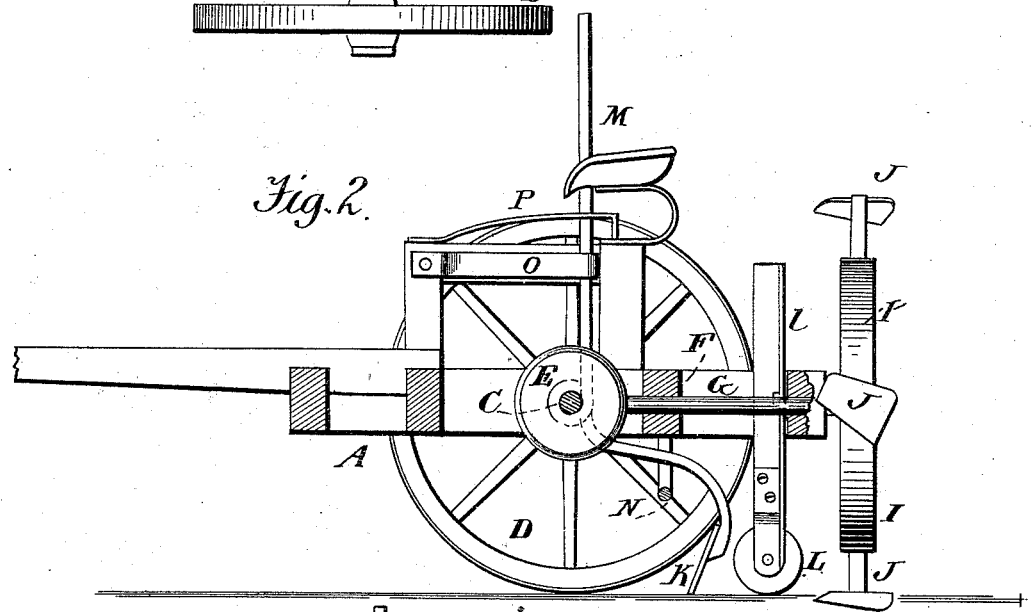
Figure 3:
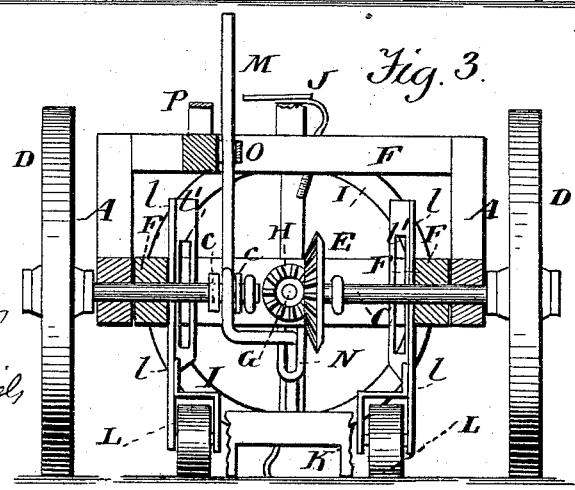

Figure 1 of the drawings is a plan view of my scraping and chopping machine; Fig. 2, a longitudinal vertical section, and Fig. 3 a transverse vertical section.

In the drawings, A represents a frame upon which is placed the seat directly over the supporting axle C which rotates with the ground wheels D D and carries the beveled spur wheel E. On this axle is pivoted the front end of the frame F which has in bearings thereof the longitudinally arranged shaft G which carries a pinion H meshing with the wheel E, and carries the chopper wheel I.

J are the chopper hoes which may be in number according to the distance apart at which the plants are intended to stand. These hoes have threaded shanks which screw radially through the rim of wheel I according to the depth at which they are intended to chop. Axle C is in two parts, one fixed and the other rotary.

K K are the scrapers, each of which is arranged in front of the gage roll L and on the lower end of the lever M which is fulcrumed on the axle C between two fixed collars $c\ c$ and moves in the loop guide N projecting down from the frame F. The upper end passes through a keeper guide O on the frame A. When it is desired to lift the frame F carrying the choppers and gage rolls from the ground, the upper end of the lever M is pressed down toward the front of the vehicle and there held by a rack P, the scrapers being also raised at the same time.

The gage rollers L L are journaled in bearings on the vertical plates $l\ l$ which are slotted at $l'$ and held by a set screw at different heights.

What I claim as new is—

The chopper frame F pivoted in front to the axle, in combination with a lever M pivoted to axle, having a bend that comes under said frame, and provided with the scrapers K; as and for the purpose set forth.

In testimony whereof I have affixed my signature in presence of two witnesses.

WILLIAM ASA TALLEY.

Witnesses:
J. D. KIMBELL,
J. E. GILLENWATERS.